Figure 5:
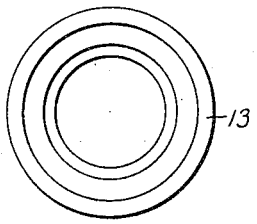

K. E. PEILER.
GLASS SHAPING MOLD.
APPLICATION FILED MAR. 17, 1914.

1,259,280.

Patented Mar. 12, 1918.

Witnesses:
S. S. Grotta
Wm A Zeiser

Inventor:
Karl E. Peiler
by W H Honiss
Atty

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

GLASS-SHAPING MOLD.

1,259,280.      Specification of Letters Patent.      Patented Mar. 12, 1918.

Application filed March 17, 1914. Serial No. 825,237.

*To all whom it may concern:*

Be it known that I, KARL E. PEILER, a citizen of the United States, residing at Hartford, in the county of Hartford and State of Connecticut, have invented new and useful Improvements in Glass-Shaping Molds, of which the following is a specification.

This invention is an improved construction of molds of the types employed for the shaping of molten glass in the manufacture of glassware.

Glass molds are ordinarily made with their interior shaping walls integral with the body and base portion of the mold. These integral molds are necessarily quite thick and heavy, for stability, and for the maintenance of proper heat conditions, and are relatively expensive to manufacture, due largely to their weight and bulk, which must be mounted in a lathe or other suitable machine, for turning or otherwise machining their finished surfaces. Moreover, when in use, the shaping surfaces of the molds rapidly become oxidized, forming a scale, which requires frequent cleaning off, for which purpose the entire mold must be taken out of use and transferred to a lathe or other machine for the purpose of cleaning off the scale. This frequent cleaning of the mold rapidly enlarges and otherwise changes its interior size and contour, so that these molds thus wear out very rapidly in use, and when discarded, the entire mold is useless for that particular pattern of ware. For these reasons it is necessary to keep on hand for each pattern of glassware a considerable number of molds, which, because of their bulk under the present practice, requires a large amount of storage room, and represents a considerable amount of capital locked up in these molds. Furthermore, as each mold is put into use its entire bulk must be "warmed in" to the required temperature, which involves more or less delay, and interruption of the glass shaping operations.

According to the present invention, the outer wall and base of the mold, which constitute by far its most bulky and weighty portions, and which are subject to very little wear, are made in one piece, herein termed the mold body; and the shaping portion, which receives all the wear and requires frequent renewal, is made in a separate piece, which is removably inserted as a lining in the main or body portion. These linings are relatively small and inexpensive to make. Therefore an ample stock of them for each pattern of glassware can be kept on hand in compact storage space, and at a small outlay of capital, while a comparatively small number of the mold bodies is sufficient for holding these linings while in use, since they may be kept constantly in use for the same pattern of glassware, or for different patterns of the same general size, the mold linings for all of which may by this system be made interchangeable in the same mold bodies. The bases may remain in position in the presses or other shaping machines in which they are employed, and need no resetting or "warming in" when the linings are changed, which requires only a few seconds. When the shaping surfaces of the mold linings become too much enlarged or altered by wear, they may be thrown away, with only moderate loss, or may be made over, at little expense, for making slightly larger patterns of ware, while the mold bodies may be continued in use indefinitely.

Figure 4:
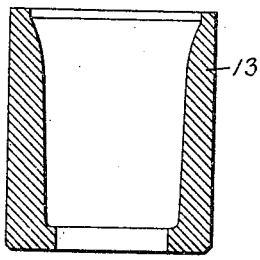
Figure 3:
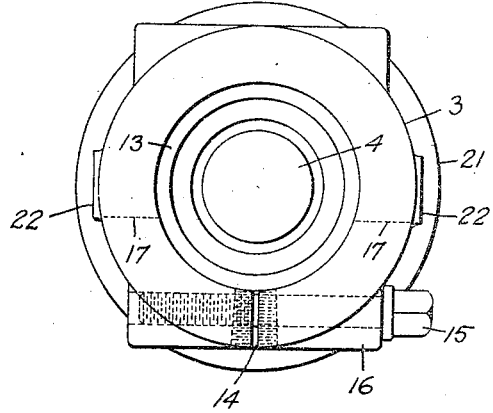
Figure 1:
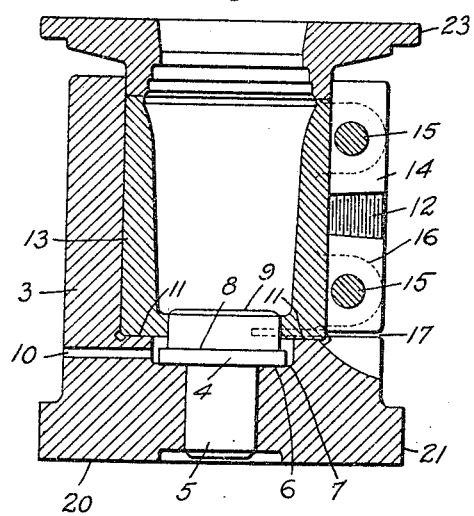
Figure 2:
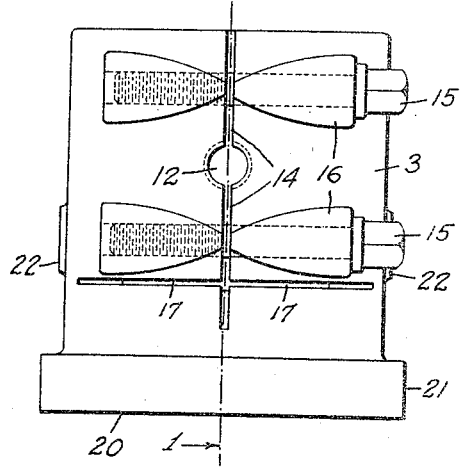

Figure 1 of the drawings is an elevation in section taken on the line 1—1 of Fig. 2, showing one of my improved molds completely assembled. Fig. 2 is an elevation projected from Fig. 1, showing the outside of the mold body. Fig. 3 is a plan view projected from Fig. 2. Fig. 4 is an elevation of the mold lining of Fig. 1, shown separately from the mold body, in section taken through its vertical center. Fig. 5 is a plan view, projected from Fig. 4.

The mold body 3 may as to its external size and contour be like the molds now employed. Internally, it is bored out to fit the outer wall of the lining, being preferably made of a standard size which will receive a large number of linings for the same pattern, or for different patterns of glassware of the same general diameter and length. The bore is preferably made substantially cylindrical, but may be made tapering if desired for any reason. Shoulders 11 at the bottom of the lining seat support the lining against downward pressure. The bottom of the mold body is counterbored to receive a valve 4, which may be of any customary form. As herein shown, the stem 5 of the valve projects through the bottom or base of the mold body, and a flange or shoulder 6 sets into a seat 7 counterbored into the inside bottom of the mold. A convenient way, as shown in Fig. 1, to prevent the valve from dropping out when the mold is inverted to eject the ware, is to make the valve with an upwardly facing shoulder 8 which, after permitting a suitable lengthwise ejecting movement of the valve, stops against the bottom of the mold lining 13, the bottom of the lining being apertured to allow the top 9 of the valve to project through the lining and form the middle portion of the bottom of the shaping cavity. Vent apertures 10 may be made in the mold body as required.

In order to hold the mold linings securely in place, and to insure close heat conducting contact and continuity between the mold lining and the outer body, the side walls of the body are made flexible and contractible upon one side or upon opposite sides of the body. In the embodiment shown in the drawings the side walls are cut through at 14, and are drawn together by means of a suitable number of screws or bolts 15, passing through bosses 16. These bosses are preferably provided in pairs upon the opposite sides of the mold body, as shown in Fig. 3, so as to enable the body to be split and clamped on both sides if desired, and also to balance the weight of the mold symmetrically on all sides of its longitudinal center, which is especially desirable in the case of hand operated molds.

To increase the free clamping action of the side walls they are preferably provided with a cross cut or kerf 17, which releases the side walls in a considerable degree from the base and insures more intimate clamping contact around the outer wall of the lining. To insure easy release and removal of the lining from the mold body, means are preferably provided for expanding the side walls, when the clamping bolts 15 are loosened. As herein illustrated, the side wall of the mold body is drilled and tapped at 12 to receive an ordinary tapering threaded pipe end or pipe plug between the split walls of the mold body. By screwing in the plug the walls are spread apart to the extent necessary. This allows of the ready removal of the lining even when it is of the same exact diameter as its seat in the body, which is desirable in order to insure proper clamping and intimate heat conducting relation between the lining and the body.

This invention is adapted for use in hand operated or mechanically or automatically operated glass presses or other shaping machines. The bottom surfaces 20 are preferably machined at right angles with the axial or longitudinal center of the mold. The circumferential surfaces 21 may be turned to standard diameter to fit into suitable receiving seats in the presses or other machine with which they may be employed. If the molds are to be manipulated by hand they may be drilled and tapped at the bosses 22 to receive the customary handles and pivot pins, in line with the approximate center of gravity of the mold, so that it may be inverted and reverted easily in the customary way.

As illustrated in Fig. 1, the lining 13 may be made shorter than its bore in the mold body, thus leaving a seat for receiving the neck ring or mold ring 23, which is thus centered accurately with the lining, in the same bored seat, and rests upon the lining to insure continuity of the shaping surfaces of the lining and the mold ring. This, however, as well as other details of the invention, may be modified in various ways, according to the character of the ware, or to suit other conditions.

I claim as my invention:—

1. The combination, in glass shaping molds, of a unitary mold body, a lining therefor, and means for contracting the walls of the mold body to hold the lining in position, and for expanding the walls to release the lining.

2. The combination, in glass shaping molds, of a mold lining, a mold body having a flexible wall, and means for flexing the wall to clamp the lining in position.

3. The combination, in glass shaping molds, of a mold lining, a mold body having a flexible wall, means for flexing the wall inwardly against the lining to clamp it in position, and means for flexing the wall outwardly to release the lining.

4. The combination, in glass shaping molds, of a unitary mold body having a substantially cylindrical interior seat for receiving a lining, and a removable relatively thin unitary lining having an exterior cylindrical surface fitting the said seat in the mold body, and having its interior surface shaped in the contour of a pattern of glassware.

5. The combination, in glass shaping molds, of a unitary mold body provided with a substantially cylindrical seat extending full size to one end of the mold for receiving a lining from said end, a shoulder at the other end of the cylindrical seat for supporting the lining against end pressure, and means for contracting the side wall of the mold body to clamp the lining in place.

6. The combination, in glass shaping molds, of a unitary mold body provided with a substantially cylindrical seat for receiving a lining, a shoulder at the bottom of the cylindrical seat for supporting the lining against end pressure, means for contracting the side wall of the mold body against the lining to hold it in place, and means for expanding the said side wall to release the lining.

7. The combination, in glass shaping molds, of a mold body having a substantially cylindrical seat for receiving a unitary lining, a removable lining in said seat, and a valve seated in the base of the mold body and projecting through the bottom of the lining.

8. The combination, in glass shaping molds, of a mold body provided with a substantially cylindrical seat for receiving a lining, and with a seat below the lining seat for receiving a valve, a removable unitary lining seated in the mold body, and having a valve opening in its bottom wall, and a valve seated in the mold body and projecting through the valve opening in the bottom of the mold lining.

9. The combination, in glass shaping molds, of a mold body having a substantially cylindrical seat for receiving a lining, and having a shoulder at the bottom of said seat for supporting the said lining, the mold body being also provided, below the said lining seat, with a seat for a valve, and a mold lining seated in the mold body and having a valve orifice in its bottom wall, and a valve seated in said body and projecting through the said orifice of the lining, the valve being provided with an upwardly facing shoulder engaging with the mold lining to limit the range of its ware-ejecting movement.

10. The combination, in glass shaping molds, of a mold body having a substantially cylindrical receiving seat, and a mold lining and a neck ring disposed in said seat.

In testimony whereof I have signed my name to this specification in the presence of two subscribing witnesses this 16th day of March, 1914.

KARL E. PEILER.

Witnesses:
H. A. GENEST,
WILLIAM A. LORENZ.